May 31, 1927.   E. LYTTON   1,631,044

NAIL, SCREW NAIL, AND THE LIKE

Original Filed Dec. 22, 1924

Inventor
Edward Lytton

Patented May 31, 1927.

1,631,044

UNITED STATES PATENT OFFICE.

EDWARD LYTTON, OF LONDON, ENGLAND.

NAIL, SCREW NAIL, AND THE LIKE.

Original application filed December 22, 1924, Serial No. 757,481, and in Great Britain February 28, 1924. Divided and this application filed June 8, 1925. Serial No. 35,647.

This application is a division of my application, Serial No. 757,481, filed December 22, 1924, and the invention forming the subject-matter thereof has for its object to provide a nail, spike or like device with means that give the device increased holding power and tend to prevent the removal, by direct outward movement, of the nail or other device from the article or material into which it has been driven by pressure or blows imparted to its head, after it has been given a turning movement about its axis.

In carrying out the invention, the shank or stem of a nail, spike, bolt or like device is provided on its outside for a part of its length with one or more projecting longitudinal ribs or strips of metal, the ribs being initially formed integrally with the shank. The ribs, after they have been formed, may during the course of manufacture be severed, in any convenient manner, from the body of the shank for the greater part of the length of a rib, one end portion of the rib remaining integral with the shank. Alternatively, each rib may have a comparatively strong junction with the shank at its end nearer the pointed end of the device, and from that junction to its other end a weaker junction, a junction made so weak that the metal of that junction will shear or rupture when the nail or spike is brought into use and the shank, after it has been driven nearly home into a piece of material, is given a turning movement about its axis.

The ribs or strips attached to the shank of a nail or spike will accompany the shank, when this under blows given to it penetrates an article or a piece of material, and when the shank is given a turning movement about its axis the ribs or strips will, owing to the turning movement, be caused to coil themselves about the shank resembling a screw thread.

The invention will be further described with reference to the accompanying drawing, in which:—

Figure 1:
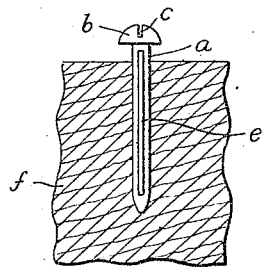
Fig. 1 is a sectional elevation showing a nail having the invention applied, the nail being shown with two projecting longitudinal ribs and driven nearly home into a piece of material.
Figure 2:
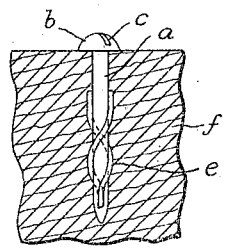
Fig. 2 is a similar view of the nail in Fig. 1, after the nail has been driven home and turned about its axis, the two projecting ribs thereby becoming severed from the shank, with the exception of the end portions nearer the point of the nail, and coiled about it.

In the arrangement shown in Figs. 1 and 2, $a$ is the shank of an ordinary round nail having at its upper end a suitably shaped head $b$, which may for instance be as shown a rounded head having a cross slot $c$ similar to that usually provided on the head of a screw. The nail is provided with two longitudinal ribs $e$ projecting from the shank.

When the nail has been driven nearly home into a piece of material as in Fig. 1, it is, by means of a screw driver or other suitable tool, given a turning movement about its axis which will cause the two ribs to become severed from the shank for the greater part of their length and coil themselves round the shank of the nail, as shown in Fig. 2, thereby forming a screw thread on the lower portion of the nail, which will draw the nail completely home and securely fasten the nail in the material $f$ and prevent the removal of the nail by direct outward movement.

Figure 3:
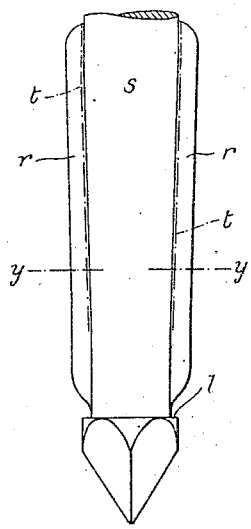
Fig. 3 is an elevation of a part of a spike provided in accordance with the invention with two ribs or strips initially formed integrally with the spike shank.
Figure 6:
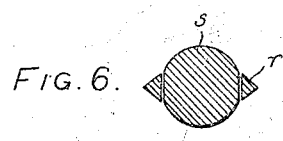
Fig. 6 is a cross section on the same line, the two ribs being shown severed from the shank for the greater part of their length.

In the arrangement shown in Figs. 3 to 6, the ribs or strips initially formed integrally with the body of the shank $s$ are, during the course of manufacture, split or severed in any convenient manner from the body part for the greater portion of their length, the line of severance being denoted by the reference letter $t$ in Fig. 3; the section in Fig. 6 shows the strips or ribs severed.

Figure 4:
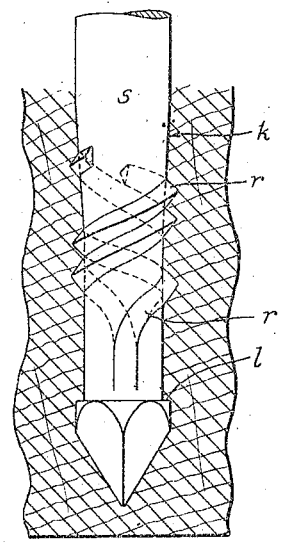
Fig. 4 is a sectional view showing the spike portion illustrated in Fig. 3, the spike having been driven into a piece of timber, such as a railway sleeper, and turned about its axis so as to cause the two ribs or strips to coil.
Figure 5:
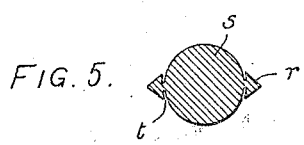
Fig. 5 is a cross section on the line $y$—$y$ in Fig. 3, showing the two ribs integral with the shank before being severed.

Upon the spike being driven into a railway sleeper or other object $j$ and being turned about its axis, the ribs $r$ will become severed if they have not been previously severed during manufacture and will be coiled in the form of a double thread about the shank $s$ and assume a position similar, more or less, to that shown in Fig. 4.

Should there be, owing to vibration or other cause, any tendency of the spike $s$ to draw out of the hole $k$ through which it has been driven, or through the coiled ribs $r$, a shoulder $l$ may be provided on the shank near its pointed end, the shouldered part being of a diameter greater than that of the adjacent part of the shank. The shoulder, in the event of the ribs becoming entirely severed from the shank, will engage against the coiled ribs and thus prevent the spike withdrawing from within the coiled ribs.

Having thus described the nature of the said invention and the best means I know of carrying the same into practical effect, I claim:—

A nail or spike device comprising a shank having a pointed end, said shank also having a plurality of projecting longitudinal ribs formed integrally therewith, each rib having a comparatively strong junction with the shank at its end nearer the pointed end of the shank, and having from that junction to its other end a junction which is so weak that, when the device has been driven home into a piece of material and is turned about its axis said latter junction will shear and permit the rib to coil about the shank.

In testimony whereof I have signed my name to this specification.

EDWARD LYTTON.